(12) United States Patent
Hong

(10) Patent No.: US 11,265,782 B2
(45) Date of Patent: Mar. 1, 2022

(54) METHOD AND SYSTEM FOR BASE STATION HANDOVER

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 34 days.

(21) Appl. No.: 16/641,282

(22) PCT Filed: Aug. 28, 2017

(86) PCT No.: PCT/CN2017/099315
§ 371 (c)(1),
(2) Date: Feb. 24, 2020

(87) PCT Pub. No.: WO2019/041095
PCT Pub. Date: Mar. 7, 2019

(65) Prior Publication Data
US 2020/0187072 A1    Jun. 11, 2020

(51) Int. Cl.
*H04W 36/08*    (2009.01)
*H04W 76/27*    (2018.01)
(Continued)

(52) U.S. Cl.
CPC .......... *H04W 36/08* (2013.01); *B64C 39/024* (2013.01); *H04W 8/08* (2013.01);
(Continued)

(58) Field of Classification Search
CPC ....... H04W 36/08; H04W 76/27; H04W 8/08; H04W 36/0016; H04W 74/0833; B64C 39/024; B64C 2201/00
See application file for complete search history.

(56) References Cited

U.S. PATENT DOCUMENTS

| | | | |
|---|---|---|---|
| 2013/0170347 A1* | 7/2013 | Zhang | H04W 36/0072 370/230 |
| 2016/0205578 A1* | 7/2016 | Lee | H04W 76/12 455/442 |

(Continued)

FOREIGN PATENT DOCUMENTS

| | | |
|---|---|---|
| CN | 102123462 A | 7/2011 |
| CN | 102469543 A | 5/2012 |

(Continued)

OTHER PUBLICATIONS

International search report of PCT application No. PCT/CN2017/099315 dated Feb. 2, 2018.

(Continued)

*Primary Examiner* — Chi H Pham
*Assistant Examiner* — Ji-Hae Yea
(74) *Attorney, Agent, or Firm* — Syncoda LLC; Feng Ma

(57) ABSTRACT

A method for base station handover includes: receiving a Handover Request message sent by a mobility management entity (MME), to which a destination base station is connected, via an S1 interface, wherein the Handover Request message carries indication information for establishing a data radio bearer (DRB) of a UAV; sending a Handover Request Acknowledge message to the MME via the S1 interface, so that the MME sends a Handover Command message to a source base station of the UAV; establishing a signaling radio bearer (SRB) for the UAV after receiving a random-access request sent by the UAV; and establishing the DRB for the UAV based on the indication information.

15 Claims, 6 Drawing Sheets

(51) Int. Cl.
  *B64C 39/02* (2006.01)
  *H04W 8/08* (2009.01)
  *H04W 36/00* (2009.01)
  *H04W 74/08* (2009.01)

(52) U.S. Cl.
  CPC ... *H04W 36/0016* (2013.01); *H04W 74/0833* (2013.01); *H04W 76/27* (2018.02)

(56) References Cited

U.S. PATENT DOCUMENTS

2016/0376031 A1* 12/2016 Michalski ............ G05D 1/0669
                                                              701/15
2017/0171761 A1   6/2017 Guvenc et al.
2017/0215119 A1   7/2017 Hong et al.

FOREIGN PATENT DOCUMENTS

| CN | 102917422 A | 2/2013 |
| CN | 103974360 A | 8/2014 |
| CN | 105264955 A | 1/2016 |
| CN | 105338573 A | 2/2016 |
| CN | 106572508 A | 4/2017 |
| CN | 106900015 A | 6/2017 |
| WO | 2016049814 A1 | 4/2016 |

OTHER PUBLICATIONS

First office action of Chinese application No. 201780000916.9 dated Apr. 21, 2020.

* cited by examiner

METHOD AND SYSTEM FOR BASE STATION HANDOVER

CROSS-REFERENCE TO RELATED APPLICATION

This application is a national stage of International Application No. PCT/CN2017/099315 filed on Aug. 28, 2017, the disclosure of which is hereby incorporated by reference in its entirety.

TECHNICAL FIELD

The present disclosure relates to the field of communication technology, and in particular to a method, apparatus and system for base station handover.

BACKGROUND

With the development of computer technology, an unmanned aerial vehicle (UAV) becomes increasingly lower in cost, and is very popular among people. People may use the UAV to capture images, transport goods, etc. at high altitude.

In the prior art, there is only provided a method for transmitting data using a proprietary protocol by the UAV, and no method for transmitting the data using a cellular network by the UAV is provided. As a result, how to perform base station handover when the UAV uses the cellular network is not available.

SUMMARY

To overcome the problems existing in the related art, the present disclosure provides a method, apparatus and system for base station handover. The technical solutions are as follows.

According to a first aspect of an embodiments of the present disclosure, there is provided a method for base station handover, the method comprising:

receiving a Handover Request message sent by a mobility management entity (MME), to which the destination base station is connected, via an S1 interface wherein the Handover Request message carries indication information for establishing a data radio bearer (DRB) of the UAV;

sending a Handover Request Acknowledge message to the MME via the S1 interface, so that the MME sends a Handover Command message to a source base station of the UAV;

establishing a signaling radio bearer (SRB) for the UAV after receiving a random-access request sent by the UAV; and establishing the DRB for the UAV based on the indication information and the SRB.

Optionally, the sending a Handover Request Acknowledge message to the MME via the S1 interface comprises:

sending the Handover Request Acknowledge message to the MME via the S1 interface, if idle resources of the destination base station are more than or equal to resources required by the UAV.

Optionally, the method further comprises;

sending a Handover Failure message to the MME via the S1 interface, if the idle resources of the destination base station are less than the resources required by the UAV.

Optionally, the indication information is a terminal type which is a UAV type, or a request for establishing a bearer required for transmitting UAV data and control signaling.

According to a second aspect of an embodiments of the present disclosure, there is provided a method for base station handover, the method comprising:

determining a destination base station for the base station handover of the UAV based on a measurement report sent by the UAV;

sending a Handover Required message to a mobility management entity (MME), to which the source base station is connected, via an S1 interface, so that the MIME sends a Handover Request message to the destination base station, wherein the Handover Required message and the Handover Request message carry indication information for establishing a data radio bearer DRB of the UAV; and sending a radio resource control (RRC) connection reconfiguration message to the UAV, upon receiving a Handover Command message sent by the MME via the S1 interface.

Optionally wherein the indication information is a terminal type which is a UAV type, or a request for establishing a bearer required for transmitting UAV data and control signaling.

According to a third aspect of an embodiments of the present disclosure, there is provided a base station, comprising:

a receiving module, configured to receive a Handover Request message sent by a mobility management entity (MME), to which the destination base station is connected, via an S1 interface, wherein the Handover Request message carries indication information for establishing a data radio bearer (DRB) of the UAV;

a sending module, configured to send a Handover Request Acknowledge message to the MME via the S1 interface, so that the MME sends a Handover Command message to a source base station of the UAV;

a first establishing module, configured to establish a signaling radio bearer (SRB) for the UAV after receiving a random-access request sent by the UAV; and a second establishing module, configured to establish the DRB for the UAV based on the indication information and the SRB.

Optionally, the sending module is configured to:

send the Handover Request Acknowledge message to the MME via the S1 interface, if idle resources of the destination base station are more than or equal to resources required by the UAV.

Optionally, the sending module is further configured to:

send a Handover Failure message to the MME via the S1 interface, if the idle resources of the destination base station are less than the resources required by the UAV.

Optionally, the indication information is a terminal type which is a UAV type, or a request for establishing a bearer required for transmitting UAV data and control signaling.

According to a fourth aspect of an embodiments of the present disclosure, there is provided a base station, comprising:

a determining module, configured to determine a destination base station for the base station handover of the UAV based on a measurement report sent by the UAV;

a sending module, configured to send a Handover Required message to a mobility management entity (MME), to which the source base station is connected, via an S1 interface, so that the MME sends a Handover Request message to the destination base station, wherein the Handover Required message and the Handover Request message carry indication information for establishing a data radio bearer DRB of the UAV; and the sending module is further configured to send a radio resource control (RRC) connection reconfiguration message to the UAV, upon receiving a Handover Command message sent by the MME via the S1 interface.

Optionally, the indication information is a terminal type which is a UAV type, or a request for establishing a bearer required for transmitting UAV data and control signaling.

According to a fifth aspect of an embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for base station handover according to the first aspect.

According to a sixth aspect of an embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for base station handover according to the second aspect.

According to a seventh aspect of an embodiments of the present disclosure, there is provided a base station, comprising a processor and a memory, wherein the memory stores at least one instruction, at least one program, a code set, or an instruction set, wherein the at least one instruction, the at least one program, the code set or the instruction set is loaded and executed by the processor to implement the method for base station handover according to the first aspect.

According to an eighth aspect of an embodiments of the present disclosure, there is provided s base station, comprising a processor and a memory, wherein the memory stores at least one instruction, at least one program, a code set, or an instruction set, wherein the at least one instruction, the at least one program, the code set or the instruction set is loaded and executed by the processor to implement the method for base station handover according to the second aspect.

According to the ninth aspect of an embodiment of the present disclosure, there is provided a system for base station handover, including a source base station, such as the base station described in the fourth aspect, and a destination base station, such as the base station described in the third aspect.

The technical solutions provided by the embodiments of the present disclosure may include the following beneficial effects.

In the embodiments of the present disclosure, the Handover Request message sent by the mobility management entity (MME) to which the destination base station is connected is received via the S1 interface, wherein the Handover Request message carries the indication information for establishing the UAV DRB; a Handover Request Acknowledge message is sent to the MME via the S1 interface, so that the MME sends the Handover Command message to the source base station of the UAV; and after the random-access request sent by the UAV is received, the signaling radio bearer (SRB) is established with the UAV; and the DRB is established for the UAV based on the indication information. As such, since the base station handover may be performed for the UAV via the S1 interface, the base station handover can be implemented when the cellular network is used.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

An exemplary embodiment of the present disclosure provides a method for base station handover. A shown in FIG. 1, an executive body of the method for base station handover may be a base station.

The base station may be provided with a processor, a transceiver, a memory, etc. The processor may be configured to process a base station handover process; the memory may be configured to store data required and data produced during the base station handover; and the transceiver may be configured to receive and transmit messages.

Figure 1:
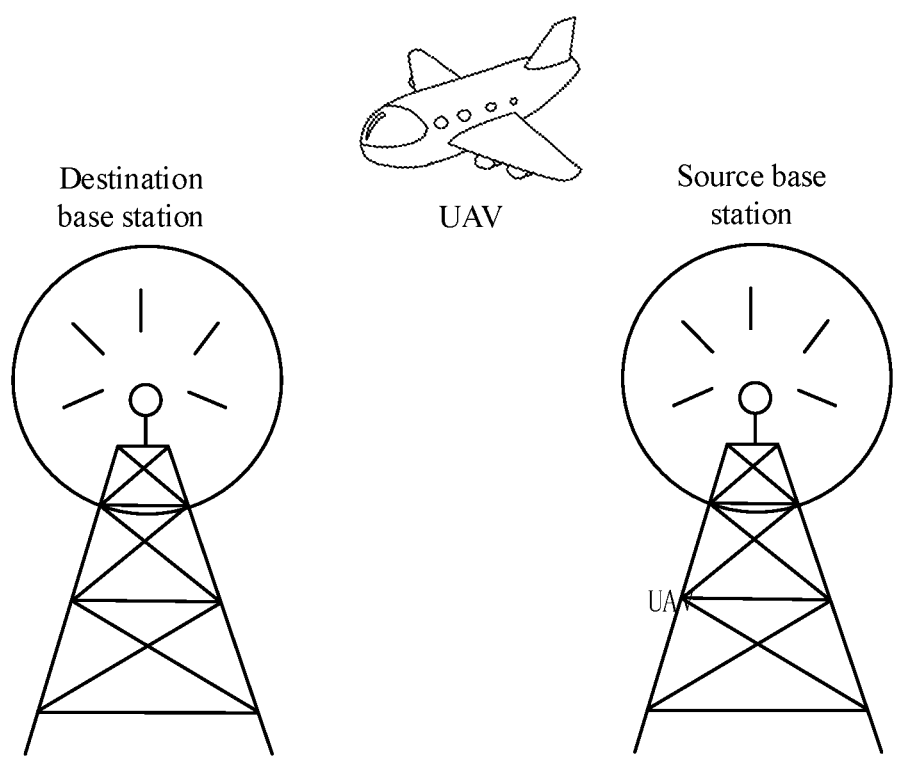
FIG. 1 is a schematic diagram of a system for base station handover according to an embodiment of the present disclosure.

In an embodiment of the present disclosure, as shown in FIG. 1, the base station may be classified into a source base station and a destination base station, wherein the source base station may be a pre-handover base station for the UAV, and the destination base station may be a post-handover base station for the UAV.

Figure 2:
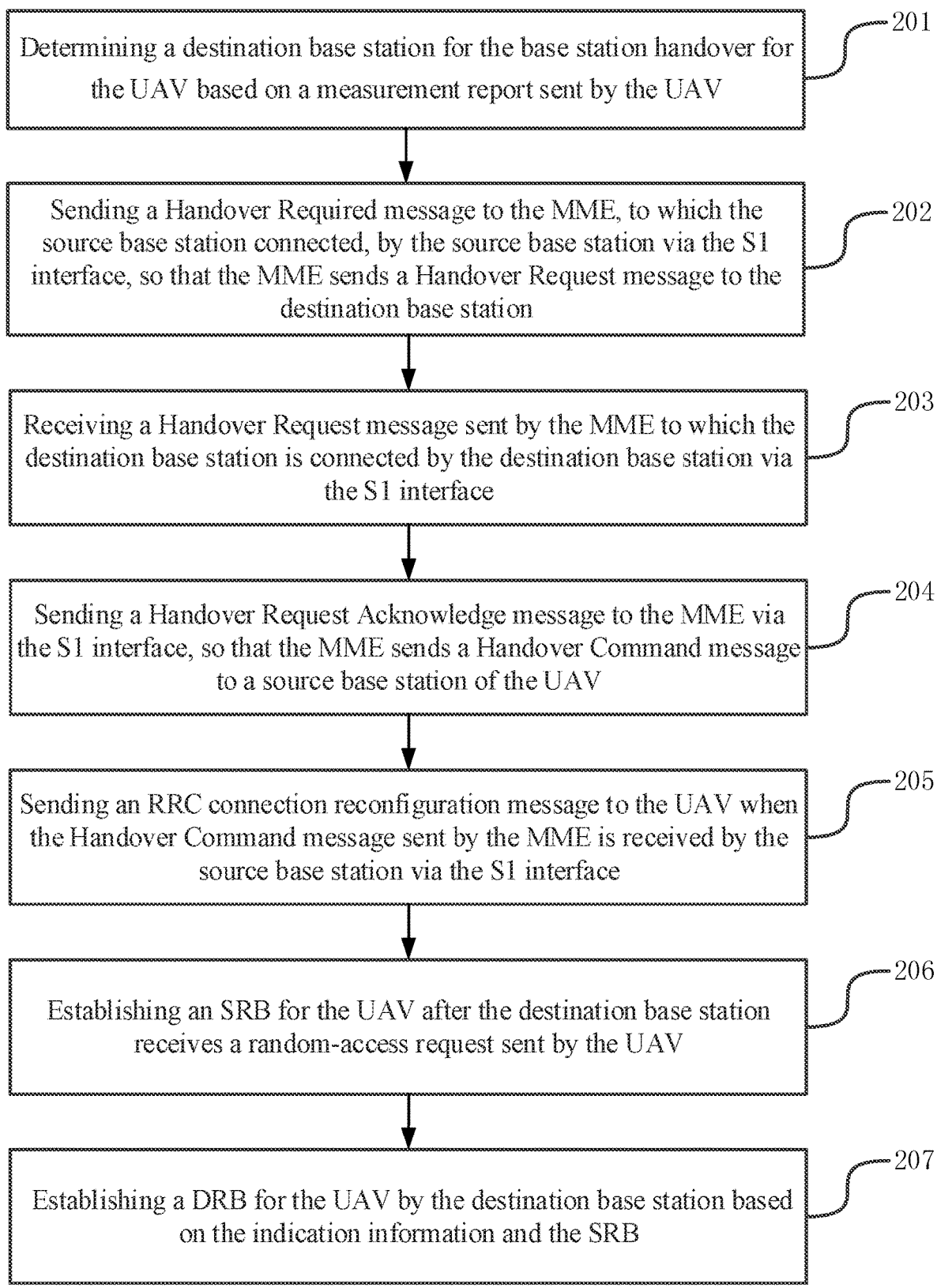
FIG. 2 is a flowchart of a method for base station handover according to an embodiment of the present disclosure.

As shown in FIG. 2, a process flow of the method may include the following steps.

In step 201, a destination base station for the base station handover is determined for the UAV based on a measurement report sent by the UAV.

In an implementation, a user may use a controller corresponding to the UAV to control the UAV to fly. During the flight of the UAV, when receiving a cell measurement report instruction sent by a source base station or when a cell measurement period is reached, the UAV may perform cell measurement to obtain the signal strength of a cell to which it belongs and the signal strength of a neighboring cell. If a base station handover condition is satisfied (for example, the signal strength of the neighboring cell is higher than that of the current cell, and the neighboring cell is covered by other base stations, etc.), the UAV may send the measurement report to the source base station, i.e. the base station which the UAV accesses, wherein the measurement report includes the measured signal strength of the cell.

After the source base station receives the measurement report sent by the UAV, a destination base station for base station handover is determined for the UAV based on a measurement report. For example, in the measurement report, when the signal strength of the neighboring cell of a source cell of the UAV is higher than that of the source cell, and this condition lasts for a period of time, the source base station may determine that the base station to which the neighboring cell belongs is a destination base station for the base station handover of the UAV.

In step 202, a Handover Required message is sent to the MME, to which the source base station connected, by the source base station via the S1 interface, so that the MME sends a Handover Request message to the destination base station.

Figure 3:
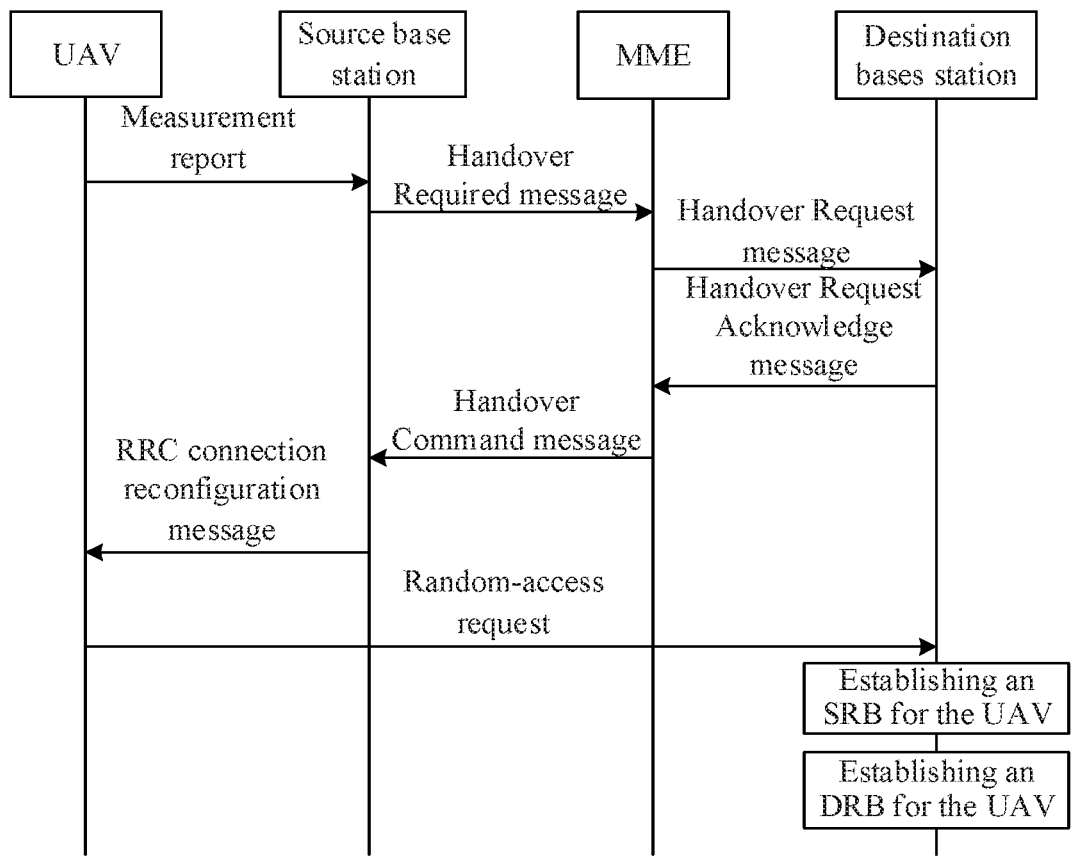
FIG. 3 is a signaling diagram for base station handover according to an embodiment of the present disclosure.
Figure 4:
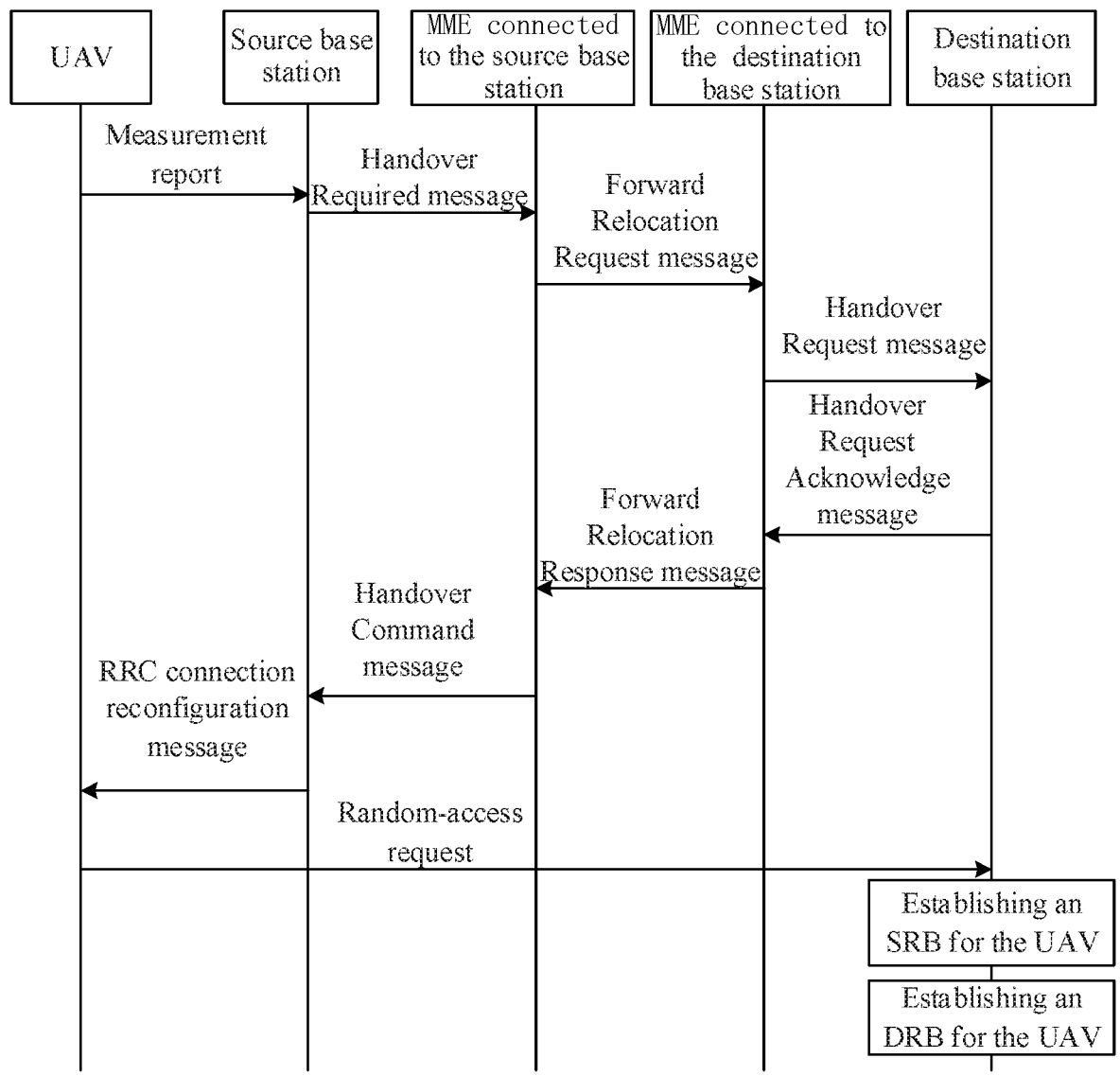
FIG. 4 is another signaling diagram for base station handover according to an embodiment of the present disclosure.

In an implementation, the UAV generally informs the source base station of its terminal type when accessing the network. After determining the destination base station for the base station handover of the UAV, the source base station may send a Handover Required message to the MME (Mobile Management Entity) to which the source base station is connected via the S1 interface, while carrying indication information for establishing a UAV DRB (Data. Resource Bearer) and an identifier of the destination base station in the message so as to request for base station handover. After receiving the Handover Required message sent by the source base station, the MME may determine whether the destination base station is connected to itself via the S1 interface by using the identifier of the destination base station carried in the Handover Required message. As shown in FIG. 3, if the destination bases station is connected to the MME via the S1 interface, the MME sends a Handover Request message to the destination base station via the S1 interface, while carrying the indication information for establishing the UAV DRB in the message. As shown in FIG. 4, if the destination bases station is not connected to the MME via the S1 interface, the MME determines an MME to which the destination base station belongs, and then sends a Forward Relocation Request message to the MME to which the destination base station belongs, while carrying the indication information for establishing the UAV DRB and the identifier of the destination base station in the message. After receiving the Forward Relocation Request message, the MME to which the destination base station belongs may determine the destination base station based on the identifier of the destination base station, and then send a Handover Request message to the destination base station via the S1 interface, while carrying the indication information for establishing the UAV DRB in the message to request for the handover.

Alternatively, the indication information for establishing UAV DRB is a terminal type which is a UAV type, or a request for establishing a bearer required for transmitting UAV data and control signaling, in order to request the destination base station to establish a bearer required for transmitting the UAV data and control signaling for the UAV.

Among them, the UAV data may be data that the UAV needs to send to the controller; the control signaling may be signaling sent by the controller to the UAV for controlling a flight path, a flight direction and the like of the UAV; and the controller refers to a device manipulated by the user for controlling the flight of the UAV. For example, when the UAV performs high-altitude image capturing, the UAV data may be image data and the like shot by the UAV during flight.

In an implementation, the indication information for establishing the UAV DRB may be a terminal type which is a UAV type, which may be used for the destination base station to determine that a terminal for which DDB is to be established is the UAV. Alternatively, the indication information for establishing the UAV DRB may be a request for establishing a bearer required for transmitting the UAV data and control signaling, which may be used for the destination base station to determine that a terminal for which DDB is to be established is the UAV.

In step 203, a Handover Request message sent by the MME to which the destination base station is connected is received by the destination base station via the S1 interface.

In an implementation, if the destination base station and the source base station belong to the same MME, the destination base station may receive the Handover Request message sent by the MME which is simultaneously connected to the destination base station and the source base station, via the S1 interface. When the destination base station and the source base station do not belong to the same MME, the destination base station may receive the Handover Request message sent by the MME to which it is connected to, via the S1, wherein the Handover Request message carries the indication information for establishing the UAV DRB for the purpose of requesting the handover.

In step 204, a Handover Request Acknowledge message is sent to the MME via the S1 interface, so that the MME sends a Handover Command message to a source base station of the UAV.

In an implementation, after receiving the Handover Request message sent by the MME to which the destination base station is connected, the destination base station may send a Handover Request Acknowledge message to the MIME, to which it is connected, via the S1 interface to inform the MME that the destination base station agrees the handover for the UAV. After receiving the Handover Request Acknowledge message sent by the destination base station, as shown in FIG. 3, the MIME to which the destination base station is connected may send a Handover Command message to the source base station via the S1 interface when the destination base station and the source base station belong to the same MME; and as shown in FIG. 4, the MME to which the destination base station is connected may send a Handover Relocation Response message to the MME, to which the source base station is connected, when the destination base station and the source base station do not belong to the same MME, and after receiving the Handover Relocation Response message, the MME to which the source base station is connected may send a Handover Command message to the source base station via the S1 interface to notify that the handover can be performed.

Alternatively, the destination base station will send the Handover Request Acknowledge message to the MIME connected only when the idle resources of the destination base station are sufficient for the UAV to use, and corresponding processes may be as follows:

If idle resources of the destination base station are more than or equal to resources required by the UAV, the Handover Request Acknowledge message is sent to the MME via the S1 interface.

In an implementation, after receiving the Handover Request message sent by the MIME to which the destination base station is connected, the destination base station may judge whether the idle resources thereof are sufficient for the UAV to use, that is, judging whether the idle resources are more than or equal to the resources required by the UAV; and if the idle resources are more than or equal to the resources required by the UAV, the destination base station may reserve the resources for the UAV, and then send a Handover Request Acknowledge message to the MME, to which it is connected, via the S1 interface. For example, when there are 30M resources in the destination base station in total, with 10M allocated to other terminals and 50M required by the UAV, which is sufficient for the UAV to use, the destination base station then may send a Handover Request Acknowledge message to the MME, to which it is connected, via the S1 interface.

Alternatively, the Handover Request Acknowledge message may include information that the destination base station agrees to establish a bearer, and the like.

In addition, when the idle resources of the destination base station are not sufficient for UAV to use, the processes of the destination base station may be as follows:

If the idle resources of the destination base station are less than the resources required by the UAV, a Handover Failure message is sent to the MME via the S1 interface.

In an implementation, after receiving the Handover Request message sent by the MM to which the destination base station is connected, the destination base station may judge whether the idle resources thereof are sufficient for the UAV to use, that is, judging whether the idle resources are greater than or equal to the resources required by the UAV; and if the idle resources are less than the resources required by the UAV, the destination base station may send a Handover Failure message to the MME, to which it is connected, via the S1 interface to notify that the UAV is not allowed to access the destination base station. After receiving the Handover Failure message sent by the destination base station, the MIME to which the destination base station is connected may send a Handover Preparation Failure message to the source base station via the S1 interface to notify a handover failure, when the destination base station and the source base station belong to the same MME; and the MME to which the destination base station is connected may send a Handover Failure message to the MME to which the source base station is connected when the destination base station and the source base station do not belong to the same MME, and after receiving the Handover Failure message, the MME to which the source base station is connected may send the Handover Preparation Failure message to the source base station via the S1 interface to notify the handover failure.

Alternatively, the Handover Failure message may also carry an access reject reason, for example, all resources of the destination base station have been allocated, etc.

In step 205, when the Handover Command message sent by the MME is received by the source base station via the S1 interface, an RRC connection reconfiguration message is sent to the UAV.

In an implementation, when receiving the Handover Command message sent by the MME, to which the source base station is connected, via the S1 interface, the source base station determines that the base station handover is available; and may send an RRC (Radio Resource Control) connection reconfiguration message to the UAV.

After receiving the RRC connection reconfiguration message sent by the source base station, the UAV may send a random-access request to the destination base station and send a random access preamble.

In step 206, an SRB is established for the UAV after the destination base station receives a random-access request sent by the UAV.

In an implementation, after receiving the random-access request sent by the UAV, the destination base station may establish SRB1 (signaling radio bearers) with the UAV. After establishing the SRB1, the UAV enters an RRC_connected status, and then transmits signaling through the SRB1 to establish SRB2 for transmitting a NAS (Non-access stratum) signaling.

In step 207, the destination base station establishes a DRB for the UAV based on the indication information and the SRB.

In an implementation, after establishing SRB1 and SRB2 with the UAV, the destination base station may determine that a terminal for which the DRB is to be established is a UAV based on the indication information carried in the Handover Request message, and then transmit the signaling through the SRB1 to establish a DRB conforming to UAV data transmission for the UAV.

After establishing the DRB for the UAV, the base station may transmit the UAV data and control signaling through the DRB.

Alternatively, the indication information for establishing the UAV DRB may be a terminal type which is a UAV type. When the destination base station determines that the terminal type is a UAV after establishing the SRB1 and the SRB2 with the UAV, the destination base station may establish a DRB for transmission of UAV data and control signaling for the UAV. Or, the indication information for establishing the UAV DRB may be a request for establishing a bearer required for transmitting the UAV data and the control signaling; and after establishing the SRB1 and the SRB2 with the UAV, the destination base station determines that the request for establishing the bearer required for transmitting the UAV data and the control signaling is received, and may establish the DRB for the transmission of UAV data and control signaling for the UAV.

It should be noted that since the UAV needs to receive a control instruction of the controller to fly, a low delay is required, and thus, the DRB established by the destination base station for the UAV is generally a low-latency DRB. In addition, the control signaling is actually a special kind of data that requires low latency.

In the embodiments of the present disclosure, the Handover Request message sent by the mobility management entity (MME) to which the destination base station is connected is received via the S1 interface, wherein the Handover Request message carries the indication information for establishing the UAV DRB; a Handover Request Acknowledge message is sent to the MIME via the S1 interface, so that the MME sends the Handover Command message to the source base station of the UAV; and after the random-access request sent by the UAV is received, the signaling radio bearer (SRB) is established with the UAV; and the DRB is established for the UAV based on the indication information. As such, since the base station handover may be performed for the UAV via the S1 interface, the base station handover can be implemented when the cellular network is used.

Figure 5:
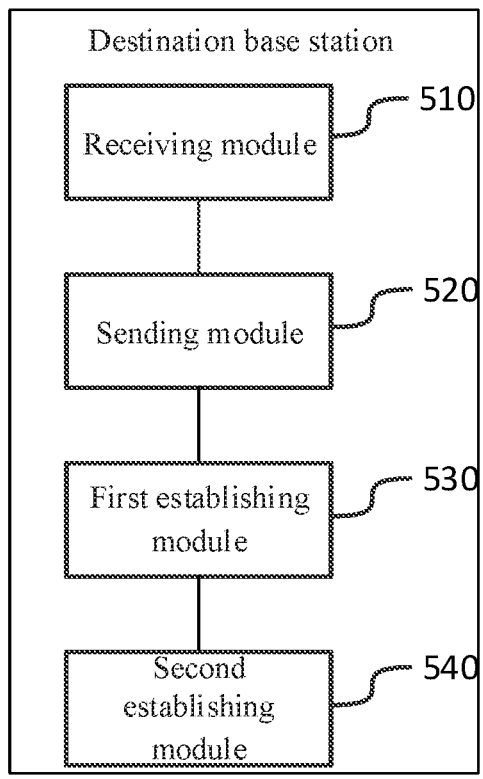
FIG. 5 is a schematic structural diagram of a base station according to an embodiment of the present disclosure.

Based on the same technical idea, another exemplary embodiment of the present disclosure provides a base station, as shown in FIG. 5, which includes:

a receiving module 510, configured to receive a Handover Request message sent by a mobility management entity (MME), to which a destination base station is connected, via an S1 interface, wherein the Handover Request message carries indication information for establishing a data radio bearer (DRB) of the UAV;

a sending module 520, configured to send a Handover Request Acknowledge message to the MME via the S1 interface, so that the MIME sends a Handover Command message to a source base station of the UAV;

a first establishing module 530, configured to establish a signaling radio b a (SRB) for the UAV after receiving a random-access request sent by the UAV; and a second establishing module 540, configured to establish the DRB for the UAV based on the indication information and the SRB.

Alternatively, the sending module 520 is configured to:

if idle resources of the destination base station are more than or equal to resources required by die UAV, send the Handover Request Acknowledge message to the MME via the S1 interface.

Alternatively, the sending module 520 is further configured to:

if the idle resources of the destination base station are less than the resources required by the UAV, send a Handover Failure message to the MME via the S1 interface.

Alternatively, the indication information is a terminal type which is a UAV type, or a request for establishing a bearer required for transmitting UAV data and control signaling.

In the embodiments of the present disclosure, the Handover Request message sent by the mobility management entity (MME) to which the destination base station is connected is received via the S1 interface, wherein the Handover Request message carries the indication information for establishing the UAV DRB; a Handover Request Acknowledge message is sent to the MME via the S1 interface, so that the MME sends the Handover Command message to the source base station of the UAV; and after the random-access request sent by the UAV is received, the signaling radio bearer (SRB) is established with the UAV, and the DRB is established for the UAV based on the indication information. As such, since the base station handover may be performed for the UAV via the S1 interface, it is unnecessary for the UAV to operate in a base station with poor signal quality, so that the data transmission is not delayed.

It should be noted that when the base stations provided in the foregoing embodiment are subject to the base station handover, the division of each functional module above is merely for an exemplary and illustrative purpose, and in actual applications, the functions above may be assigned to and completed by different functional modules as required, that is, the internal structure of each base station is divided into different functional modules to complete all or some of the functions described above. In addition, the base stations provided in the foregoing embodiments and the method embodiments of the base station handover belong to the same technical idea, and a reference may be made to the method embodiments for the detailed implementation process, which will not be repeated in detail herein.

Figure 6:
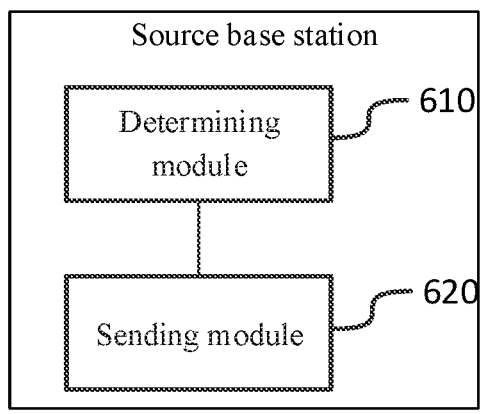
FIG. 6 is another schematic structural diagram of a base station according to an embodiment of the present disclosure.

Based on the same technical idea, another exemplary embodiment of the present disclosure provides a base station, as shown in FIG. 6, which includes:

a determining module 610, configured to determine a destination base station for the base station handover of the UAV based on a measurement report sent by the UAV;

a sending module 620, configured to send a Handover Required message to a mobility management entity (MME), to which a source base station is connected, via an S1 interface, so that the MME sends a Handover Request message to the destination base station, wherein the Handover Required message and the Handover Request message carry indication information for establishing a data radio bearer DRB of the UAV; and the sending module 620 is further configured to, when receiving a Handover Command message sent by the MME via the S1 interface, send a radio resource control (RRC) connection reconfiguration message to the UAV.

Alternatively, the indication information is a terminal type which is a UAV type, or a request for establishing a bearer required for transmitting UAV data and control signaling.

In the embodiments of the present disclosure, the Handover Request message sent by the mobility management entity (MME) to which the destination base station is connected is received via the S1 interface, wherein the Handover Request message carries the indication information for establishing the UAV DRB; a Handover Request Acknowledge message is sent to the MME via the S1 interface, so that the MME sends the Handover Command message to the source base station of the UAV; and after the random-access request sent by the UAV is received, the signaling radio bearer (SRB) is established with the UAV; and the DRB is established for the UAV based on the indication information. As such, since the base station handover may be performed for the UAV via the S1 interface, the base station handover can be implemented when the cellular network is used.

It should be noted that when the base stations provided in the foregoing embodiment are subject to the base station handover, the division of each functional module above is merely for an exemplary and illustrative purpose; and in actual applications, the functions above may be assigned to and completed by different functional modules as required, that is, the internal structure of each base station is divided into different functional modules to complete all or some of the functions described above. In addition, the base stations provided in the foregoing embodiments and the method embodiments of the base station handover belong to the same technical idea, and a reference may be made to the method embodiments for the detailed implementation process, which will not be repeated in detail herein.

Figure 7:
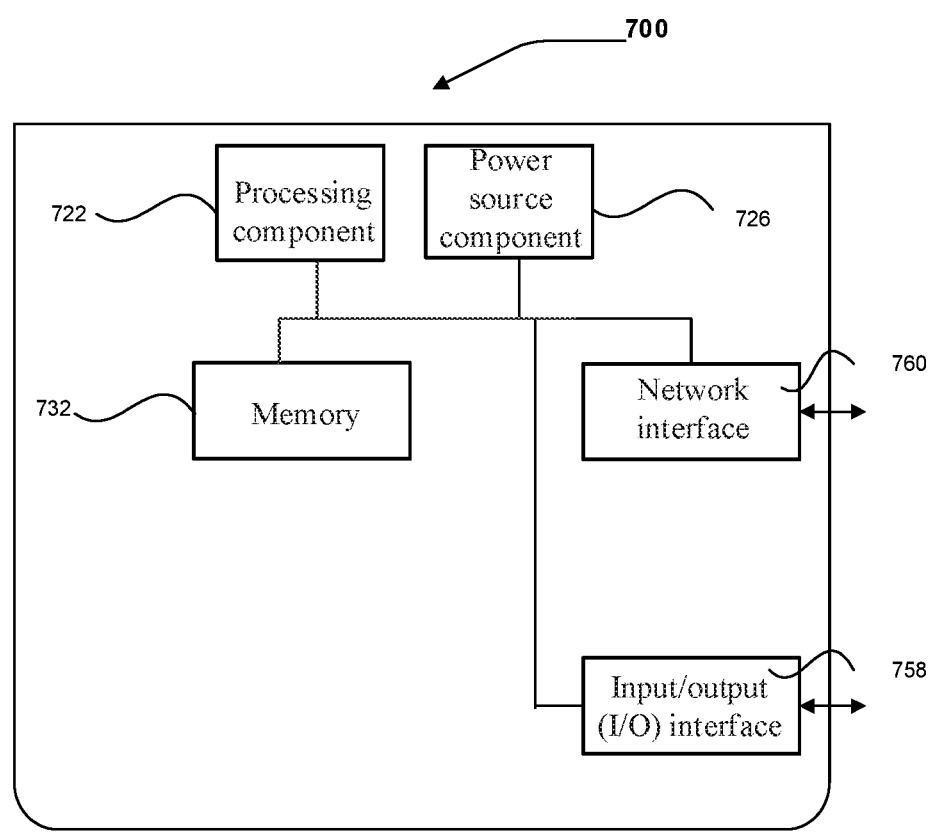
FIG. 7 is another schematic structural diagram of a base station according to an embodiment of the present disclosure.

A further exemplary embodiment of the present disclosure provides a schematic structural diagram of a base station. Referring to FIG. 7, a base station 700 includes a processing component 722 which further includes one or more processors, and memory resources represented by a memory 732 for storing instructions executable by the processing component 722, for example an application program. The application program stored in the memory 732 may include one or more than one module, each of which corresponds to a set of instructions. Further, the processing component 722 is configured to execute instructions to perform the above method as shown, used and recorded.

The base station 700 may also include a power source component 726 configured to perform power source management of the base station 700, a wired or wireless network interface 760 configured to connect the base station 700 to the network, and an input/output (110) interface 768. The base station 700 may operate an operating system stored in the memory 732, such as Windows Server™, Mac OS X™, Linux™, FreeBSD™ or the like.

The base station 700 may include a memory, and one or more programs, wherein the one or more programs are stored in the memory, and configured to be executed by the one or more processors to execute the method for base station handover described above.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A method for base station handover, which is applied to a destination base station to be used with an unmanned aerial vehicle (UAV), comprising:
   receiving a Handover Request message sent by a mobility management entity (MME), to which the destination base station is connected, via an S1 interface, wherein the Handover Request message carries indication information for establishing a data radio bearer (DRB) of the UAV; the indication information is a terminal type which is a UAV type or a request for establishing a bearer required for transmitting UAV data and control signaling; the UAV data is data that the UAV needs to send to a controller; the control signaling is signaling sent by the controller to the UAV; and the controller refers to a device manipulated by a user for controlling a flight of the UAV;
   sending a Handover Request Acknowledge message to the MME via the S1 interface, so that the MME sends a Handover Command message to a source base station of the UAV;
   establishing a first signaling radio bearer (SRB1) with the UAV after receiving a random-access request sent by the UAV, and transmitting signaling through the SRB1 to establish a second signaling radio bearer (SRB2) with the UAV for transmitting a non-access stratum (NAS) signaling; and
   determining that a terminal for which the DRB is to be established is the UAV based on the indication information and transmitting the signaling through the SRB1 to establish a low-latency DRB conforming to UAV data transmission for the UAV.

2. The method according to claim 1, wherein the sending a Handover Request Acknowledge message to the MME via the S1 interface comprises:
   sending the Handover Request Acknowledge message to the MME via the S1 interface, if idle resources of the destination base station are not less than resources required by the UAV.

3. The method according to claim 2, further comprising:
   sending a Handover Failure message to the MME via the S1 interface, if the idle resources of the destination base station are less than the resources required by the UAV.

4. A method for base station handover, which is applied to a source base station in communication with an unmanned aerial vehicle (UAV), comprising:
   determining a destination base station for the base station handover of the UAV based on a measurement report sent by the UAV;
   sending a Handover Required message to a mobility management entity (MME), to which the source base station is connected, via an S1 interface, so that the MME sends a Handover Request message to the destination base station, wherein the Handover Required message and the Handover Request message carry indication information for establishing a data radio bearer (DRB) of the UAV; the indication information is a terminal type which is a UAV type, or a request for establishing a bearer required for transmitting UAV data and control signaling; the UAV data is data that the UAV needs to send to a controller; the control signaling is signaling sent by the controller to the UAV; and the controller refers to a device manipulated by a user for controlling a flight of the UAV; the destination base station is configured to establish a first signaling radio bearer (SRB)1 with the UAV after receiving a random-access request sent by the UAV, and transmit signaling through the SRB1 to establish a second signaling radio bearer (SRB2) with the UAV for transmitting a Non-access stratum(NAS) signaling; and determine that a terminal for which the DRB is to be established is the UAV based on the indication information, and transmit the signaling through the SRB1 to establish a low-latency DRB conforming to UAV data transmission for the UAV; and
   sending a radio resource control (RRC) connection reconfiguration message to the UAV, upon receiving a Handover Command message sent by the MME via the S1 interface.

5. A base station implementing the method of claim 4, which is the source base station corresponding to the unmanned aerial vehicle (UAV), comprising a processor, and memory storing at least one instruction, at least one program, a code set, or an instruction set for execution by the processor to perform operations of the method.

6. A system for base station handover, comprising the source base station according to claim Y, and the destination base station to be used with the UAV, wherein the destination base station comprises a processor, and memory storing at least one instruction, at least one program, a code set, or an instruction set for execution by the processor to perform:
   receiving a Handover Request message sent by a mobility management entity (MME), to which the destination base station is connected, via an S1 interface, wherein the Handover Request message carries indication information for establishing a data radio bearer (DRB) of the UAV; the indication information is a terminal type which is a UAV type, or a request for establishing a bearer required for transmitting UAV data and control signaling; the UAV data is data that the UAV needs to send to a controller; the control signaling is signaling sent by the controller to the UAV; and the controller refers to a device manipulated by a user for controlling a flight of the UAV;
   sending a Handover Request Acknowledge message to the MME via the S1 interface, so that the MME sends a Handover Command message to a source base station of the UAV;
   establishing a first signaling radio bearer (SRB1) with the UAV after receiving a random-access request sent by the UAV, transmitting signaling through the SRB1 to establish a second signaling radio bearer (SRB2) with the UAV for transmitting a non-access stratum (NAS) signaling; and
   determining that a terminal for which the DRB is to be established is the UAV based on the indication information and transmitting the signaling through the SRB1 to establish a low-latency DRB conforming to UAV data transmission for the UAV.

7. The system according to claim 6, wherein the base station handover is performed for the UAV via the S1 interface.

8. The system according to claim 6, wherein the base station handover is implemented in a cellular network.

9. The system according to claim 6, wherein the sending a Handover Request Acknowledge message to the MME via the S1 interface comprises:
sending the Handover Request Acknowledge message to the MME via the S1 interface, responsive to that idle resources of the destination base station are not less than resources required by the UAV.

10. The system according to claim 9, wherein the processor is further configured to perform:
sending a Handover Failure message to the MME via the S1 interface, if the idle resources of the destination base station are less than the resources required by the UAV.

11. The method according to claim 4, wherein the sending the Handover Required message to the MME, to which the source base station is connected, via the S1 interface, so that the MME sends the Handover Request message to the destination base station comprises:
sending the Handover Required message to the MME, to which the source base station is connected, via the S1 interface, so that if the MME determines that the destination bases station is connected to the MME via the S1 interface, sends the Handover Request message to the destination base station via the S1 interface.

12. The method according to claim 4, wherein the sending the Handover Required message to the MME, to which the source base station is connected, via the S1 interface, so that the MME sends the Handover Request message to the destination base station comprises:
sending the Handover Required message to the MME, to which the source base station is connected, via the S1 interface, so that if the MME determines that the destination bases station is not connected to the MME via the S1 interface, sends a Forward Relocation Request message to the MME to which the destination base station is connected, so that the MME to which the destination base station is connected sends the Handover Request message to the destination base station via the S1 interface.

13. A base station, which is a destination base station to be used with an unmanned aerial vehicle (UAV), comprising a processor, and memory storing at least one instruction, at least one program, a code set, or an instruction set for execution by the processor to:
receive a Handover Request message sent by a mobility management entity (MME), to which the destination base station is connected, via an S1 interface, wherein the Handover Request message carries indication information for establishing a data radio bearer (DRB) of the UAV; the indication information is a terminal type which is a UAV type, or a request for establishing a bearer required for transmitting UAV data and control signaling; the UAV data is data that the UAV needs to send to a controller; the control signaling is signaling sent by the controller to the UAV; and the controller refers to a device manipulated by a user for controlling a flight of the UAV;
send a Handover Request Acknowledge message to the MME via the S1 interface, so that the MME sends a Handover Command message to a source base station of the UAV;
establish a first signaling radio bearer (SRB1) with the UAV after receiving a random-access request sent by the UAV, and transmit signaling through the SRB1 to establish a second signaling radio bearer (SRB2) with the UAV for transmitting a non-access stratum (NAS) signaling; and
determine that a terminal for which the DRB is to be established is the UAV based on the indication information, and transmit the signaling through the SRB1 to establish a low-latency DRB conforming to UAV data transmission for the UAV.

14. The base station according to claim 13, wherein the processor is configured to send a Handover Request Acknowledge message to the MME via the S1 interface, such that the MME sends a Handover Command message to a source base station of the UAV to perform:
sending the Handover Request Acknowledge message to the MME via the S1 interface, responsive to that idle resources of the destination base station are not less than resources required by the UAV.

15. The base station according to claim 14, wherein the processor is further configured to send a Handover Request Acknowledge message to the MME via the S1 interface, such that the MME sends a Handover Command message to a source base station of the UAV to perform:
sending a Handover Failure message to the MME via the S1 interface, responsive to that the idle resources of the destination base station are less than the resources required by the UAV.

* * * * *